Nov. 2, 1948.    E. L. SELSMEYER    2,452,604
METHOD OF AND APPARATUS FOR INCLOSING
A FOLDED PARACHUTE PACK
Filed April 3, 1945    3 Sheets-Sheet 1
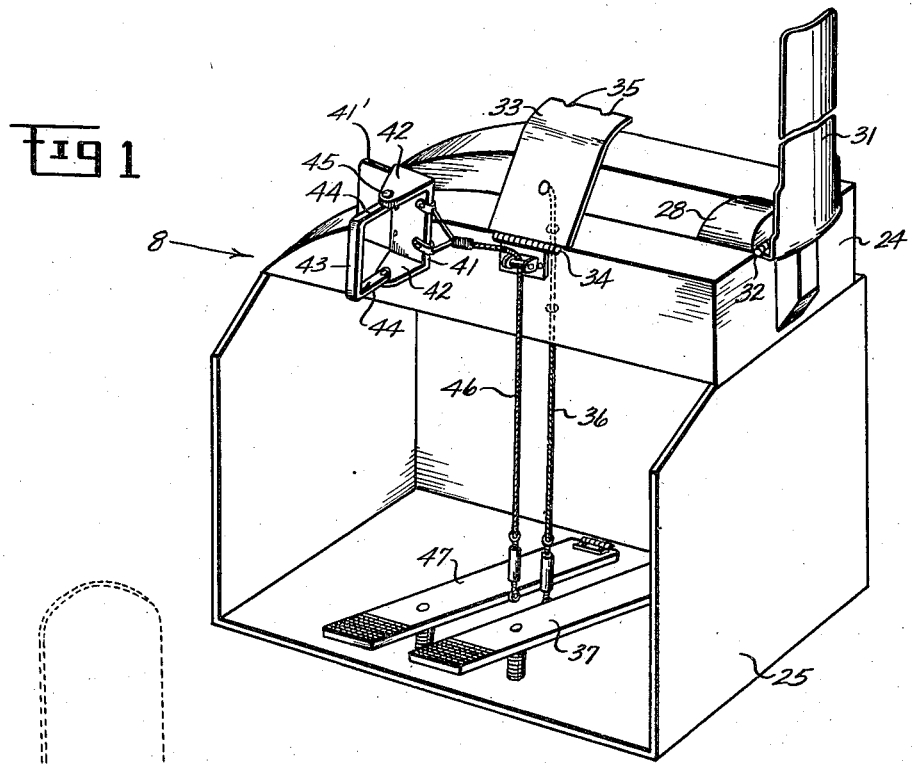
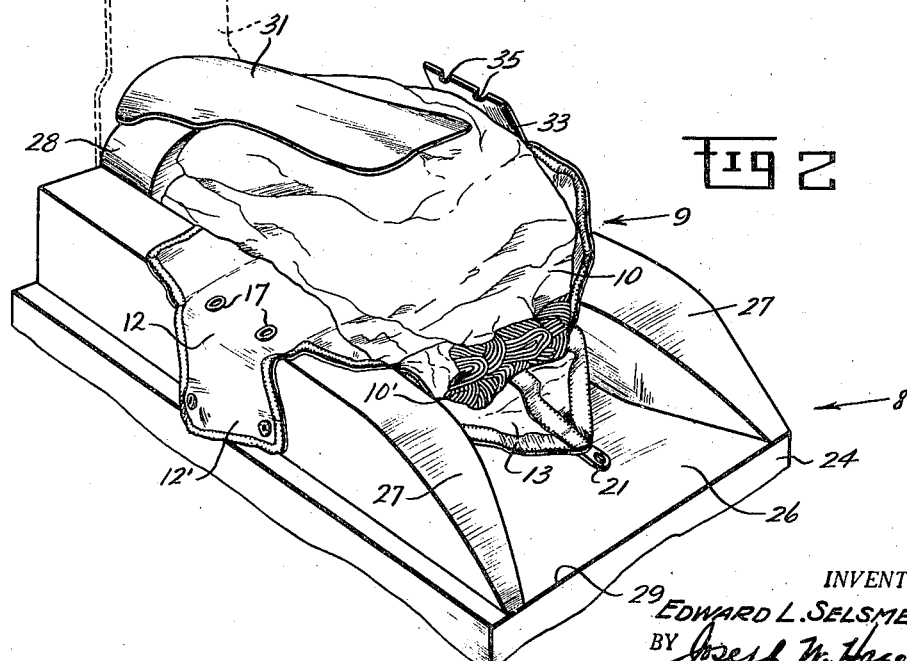
INVENTOR.
EDWARD L. SELSMEYER
BY
ATTORNEYS

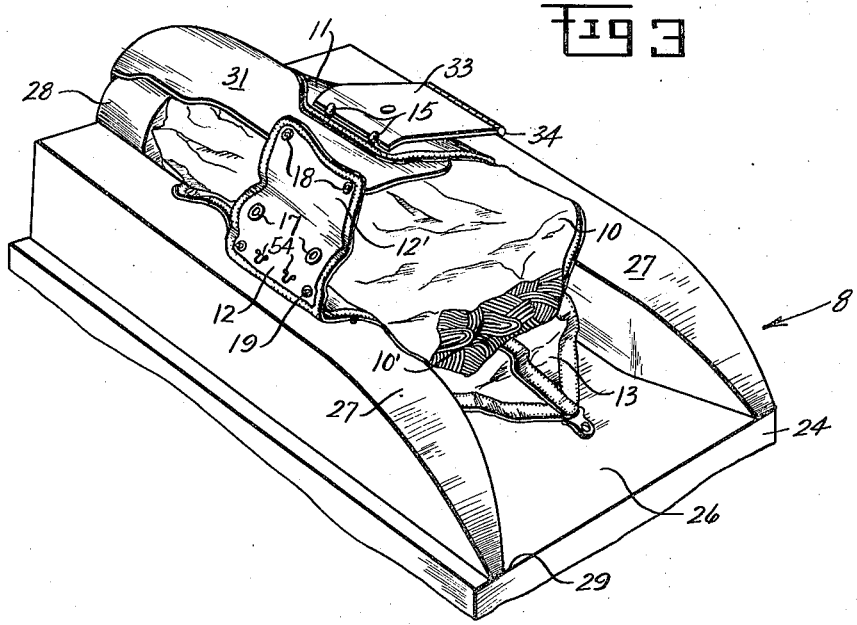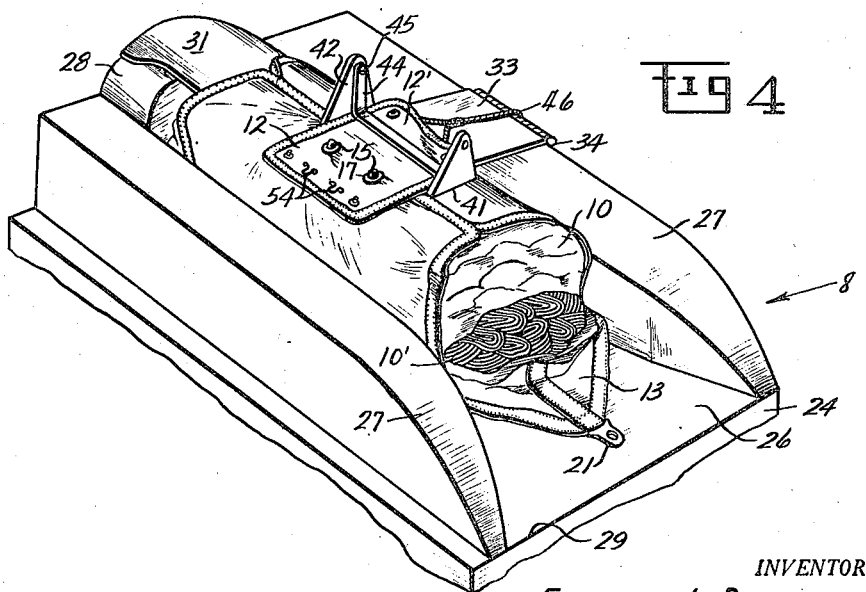

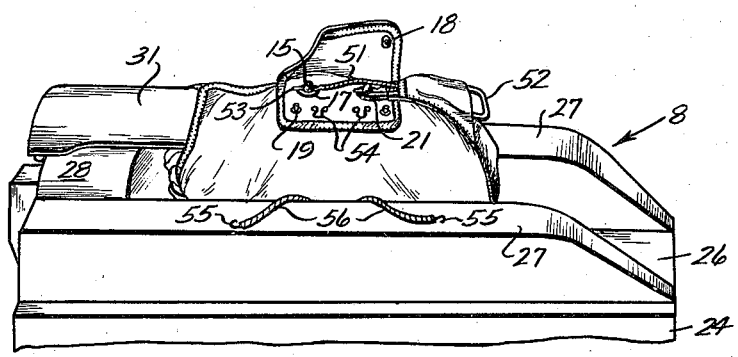
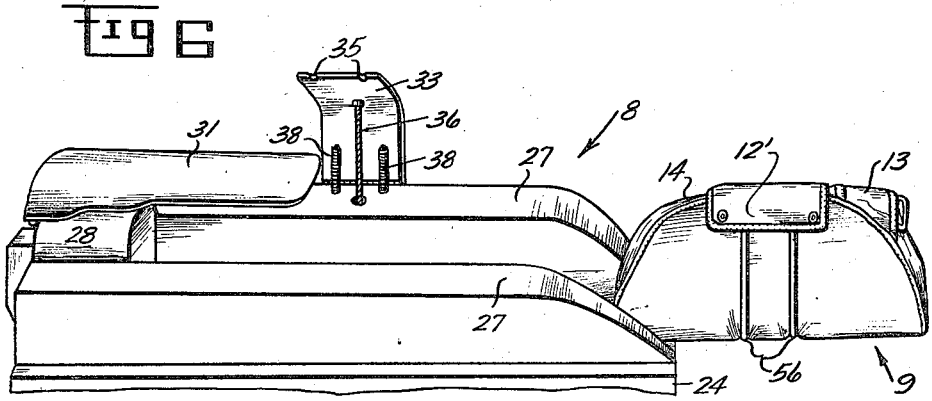

Patented Nov. 2, 1948

2,452,604

UNITED STATES PATENT OFFICE 2,452,604

METHOD OF AND APPARATUS FOR INCLOSING A FOLDED PARACHUTE PACK

Edward L. Selsmeyer, Green Bay, Wis.

Application April 3, 1945, Serial No. 586,433

10 Claims. (Cl. 100—14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a device used for holding and securing the flaps of a cover or pack around a parachute or the like which is held in a folded position therein.

In wrapping a folded flexible article, and especially where it is an aviator's parachute, the folded article is enclosed in a cover or pack containing closure flaps foldable around the article, and on a parachute pack such flaps are equipped with coengaging fastening elements. Heretofore, these flaps on the packs were drawn and closed around the contained folded parachute or like article by hand, and such operation of pulling the pack flaps manually around the parachute and at the same time holding the pack steady and also securing the fastening means together was quite difficult, required tedious effort and consumed considerable time, and the parachute was inclined to become ruffled and distorted in the pack by such hand-packing operation.

An essential object of this invention is to provide a device or machine which is arranged to support and partly embrace the pack with the parachute or similar article resting thereon, and which device comprises instrumentalities for engaging the flaps of the pack and for drawing them firmly together around the folded parachute and will thereby facilitate securing the flaps together thereon, so as to expedite enclosing the parachute in the pack evenly and firmly folded together and to eliminate tedious time consuming manual operation as far as possible.

Another object of this invention is to provide a parachute closing device whereby the flaps of the pack can be drawn and secured together speedily upon the enclosed parachute while the latter is held neatly in its folded position therein, without ruffling or upsetting the parachute by and handling and turning of the pack during the flap fastening operation.

Another object of this invention is to provide such a device including means whereby to grasp the flap and which is actuated by leg power, so that the flaps can be drawn forcefully and quickly upon the folded parachute, and so as to constantly exert pressure downward on the flaps and the folded parachute to hold the same steadily in a neatly-folded position by foot action, thus facilitating closing the pack by hand.

Another object of this invention is to provide an improved method of operation for drawing and closing the flaps of a pack firmly around a neatly-folded parachute, without ruffling or disturbing its originally-folded condition and with a minimum of handling thereof.

These and various other objects and advantages are attained with this invention as will become apparent from the following description, taken in connection with the accompanying drawings wherein the invention is shown in its preferred form, it being evident that other arrangements and forms of construction may be resorted to in carrying out the objects and purposes of this invention.

In the drawings:

Fig. 1 is a perspective view illustrating my novel pack-enclosing machine or device in its idle position.

Fig. 2 is a perspective view showing the recessed platform supporting the pack with the folded parachute resting thereon and the holding arm swung down on the parachute.

Fig. 3 is a perspective view showing the device with its cone flap-holding member engaging the cones and pressing the flap with the underlying arm down on the folded parachute.

Fig. 4 is a perspective view showing the rip cord protector flap clasped and drawn down by the clamping member and secured onto the cone flap.

Fig. 5 is a perspective view showing one end flap closed and the rip cord secured in place with the protecting portion of the rip cord flap unlatched and the last end flap open, but the pack ready to be withdrawn from the device.

Fig. 6 is a perspective view showing the closed pack with the folded parachute therein being withdrawn from the recessed platform of this device.

As illustrated in the drawings, my improved closing device or machine 8 is adapted and arranged for closing the flaps or similar extending portions of a cover 9, such as a parachute pack, around a folded article 10, and more especially a folded parachute canopy utilized in aviation and provided with shroud lines 10'.

In the form of invention disclosed herein the cover or pack 9 includes four flaps 11, 12, 13, and 14. The flap 11 is provided with a pair of projecting elements 15 which are shown in the shape of cones having transversely extending apertures near the upper ends, while the opposite flap 12 has a pair of eyelets or grommets 17 to be engaged over said cones 15, and this flap 12 includes an outer covering part 12' having eyelets 18 thereon to be clasped on stems 19 on the main part of said flap when the part 12' is folded down in closed position, as shown in Fig. 6. The flaps 13 and 14 are provided each with an eyelet or grommet 21 to be engaged over one of the cones 15, in closing the pack with the parachute folded therein.

As shown in the drawings, my improved device 6 comprises a supporting member which is substantially in the form of a table including a platform or top 24 supported on a frame 25. Said platform is provided with an enclosing portion to partly embrace and hold the parachute pack therein, and this is preferably provided in the form of a recessed part 26 formed by two side bars 27 and an intervening block 28 at one end, for enclosing three sides of the pack, while the foot end 29 is open to allow for convenient withdrawal of the pack with the parachute therein. Said recess 26 is of such a shape and size as to fit the pack with the parachute 10 resting in its folded position on the main part of said pack while the flaps are extended.

This device is provided with a holding member or arm 31 which is movably supported at one end on the platform 24, being shown as swingably mounted by hinge means 32 and being concave in shape and swingable downward upon the parachute to compress it in the pack within said recess 26. A holder 33 is mounted movably on the platform, being shown in the shape of a plate hinged at 34, and it is provided with notched means 35 or similar holding means to engage said cones or projecting elements 15 on the flap 11, and thereby retain the flap in place. A cable 36 extends from said plate 33 to a foot actuated member or treadle 37 so that leg power can be applied for forcing said plate down firmly on the hinged arm 31 and thereby forcefully pressing down the parachute in proper folded position, as best shown in Fig. 3. Spring means 38 urges plate 33 automatically to its raised position, as shown in Fig. 6.

A clamping member 41 is provided herein whereby to draw the opposite flap 12 onto the cone flap 11, and this member 41 is in the form of a yoke-shaped frame having legs 42 combined with a U-shaped clamping bar 43 having arms 44 which are connected by pivots 45 to said legs 42, so that when the flap extension 12' is clasped in this clamping member the bight of member 43 will press said extension onto the bight of member 41 and will thus clamp it in position therebetween, as shown in Fig. 4. A cable 46 extends from clamping member 41 to a treadle or foot actuated member 47 to be operated by leg power for forcefully pulling the flap 12 onto flap 11 thereby liberating the hands to facilitate snapping the grommets 17 readily onto the cones 15, as best shown in Fig. 4. Member 41 is provided with a flexible cone-protecting flap 41'.

The treadles 37 and 47 are now held down by foot action and the pack with its flaps 11 and 12 are thereby held firmly in place, thus leaving the hands free, so that the end flap 13 can then be conveniently drawn into its closed position by hand and its grommet 21 snapped onto an adjacent cone 15, as shown in Fig. 5. Thereupon the rip cord 51 with its handle 52 can be readily applied in the usual manner and have its pins 53 pass through said apertures in cones 15, to secure these three flaps in place and hold the parachute safely in the pack, and thereby facilitate withdrawing the pack with the parachute therein from the arm 31 and the recess 26, in the manner and form as shown in Fig. 5.

The last flap 14 can then be drawn closed while the adjacent cone has its rip cord pin 53 released, and the eyelet of this flap 14 placed on said adjacent cone and pin 53 inserted, thus inclosing the parachute in the pack. The flap 12 also has eyes 54 thereon to receive therein the hook ends 55 on the flexible cords 56, and the extension 12' on flap 12 is then folded down and secured in its closed position, thus fully closing the pack upon the folded parachute, in the manner shown in Fig. 6.

The improved method which I utilize in closing a folded parachute or the like in a pack of this type, and which is especially facilitated by the use of this unique device disclosed herein, is carried out substantially as follows:

The pack with the folded parachute resting on its intermediate part is placed in a dished support, for instance the recessed part 26 of platform 24 which substantially embraces the pack, with the flaps of the pack extending outward, as disclosed in Fig. 2, and a holding member, for instance, the hinged arm 31, is then pressed down upon the parachute.

Next, as shown in Fig. 3, the cones 15 of flap 11 are engaged against a suitable holding member, like the plate 33 mounted on platform 34, and this flap will thus be held in position, leg power being preferably utilized, as by means of the treadle 37 and cable 36, to force down the plate 33 and the cone flap 11 onto the arm 31 and thereby compact the parachute within the pack.

Next, the flap 12, opposite the cone flap 11, is grasped, preferably by the clamping member 41 clasping the extension 12' of the flap 12 therein, and leg power is preferably utilized, as by means of treadle 47 and the cable 46, thereby forcing the flap 12 upon flap 11, and leave the hands free to facilitate snapping the grommets upon the cones, as shown in Fig. 4.

By this manner of holding and closing the pack on the parachute the end flap 13 can then be readily drawn up and its grommet snapped on the adjoining cone, whereupon the rip cord is applied in the usual manner with its pins 53 inserted in the apertures of the cones, as shown in Fig. 5.

The clamp 41 is released and withdrawn from flap 12, and the pack is slid outward in recess 26, off from arm 31, and the last flap 14 is closed with its grommet placed on the adjoining cone, and the pack fully closed as explained above and as indicated in Fig. 6.

I claim:

1. A device for folding the projecting flaps of a cover around a folded article resting on said cover, said device comprising means shaped to support and to hold in place the cover with the article therein, a holder to bear on said folded article and hold it in place, a holding member including means to engage one flap of the cover whereby to hold said flap firmly in position, and means for clasping therein a flap opposite the first said flap and drawing it down in closed position thereon in such a manner that a third flap on the cover can be conveniently drawn manually in closed position to facilitate withdrawing the cover with the folded article incased therein from the device.

2. A parachute pack closing device comprising means shaped to support and partly inclose a parachute pack which carries a folded parachute thereon and which includes foldable flaps extending outwardly therefrom, a holder on the device to bear on said folded parachute, a holding member including means to engage one flap of the pack whereby to hold the flap firmly in position and press it down on said holder, and means for grasping a flap opposite the first said flap and drawing it down in closed position thereon, the device being arranged for holding the pack so that a third flap on the pack can be conveniently drawn manually in closed position, whereby the pack with the folded parachute securely retained therein may then be readily withdrawn from the device.

3. A parachute pack closing device comprising means for supporting a parachute pack which includes flaps extending outwardly and having cooperating elements thereon for securing them together, said pack carrying a folded parachute on the intermediate part thereof, an arm on the device swingable onto the folded parachute for holding it in position, a foot actuated holding member including means to engage the elements provided on one flap of the pack whereby to hold said flap firmly in position and also to press down on said arm and compress the parachute, and foot actuated means whereby to clasp the flap opposite the first said flap and draw it down in closed position thereon, to enable securing said two flaps together and hold the parachute firmly in the pack and facilitate drawing a third flap into closed position and secure it to said fastening elements, whereby the pack with the folded parachute securely held therein may then be readily slid off from said arm and withdrawn from the device for completing the final pack-closing operation.

4. A machine for inclosing a folded article in a wrapper of the type which contains a plurality of outwardly extending portions at least one of which is provided with a holding element and the other portions are provided each with means for engaging said element, said machine comprising a support shaped to embrace the wrapper therein with the article resting thereon and the portions extending therefrom, a holding arm to bear down on the article, a retaining member having means to engage said holding element and thereby hold the element-equipped portion firmly down on the folded article, and coacting clamping means for clasping therein and drawing the opposite portion in place and facilitate securing its fastening means onto said element to secure these portions together and hold the article in position in the wrapper, whereby to facilitate closing another extending portion with its securing means engaged on said elements, and facilitate removing the wrapper with the article from the machine.

5. A machine for inclosing a folded flexible article in a wrapper of the type which contains a plurality of flaps at least one of which is provided with a projecting element and the other flaps are provided with means for engaging said element, said machine comprising a recessed support to receive the pack in the recess with the flaps unfolded and the article resting on the wrapper, a holding arm to bear down on the article, a retaining member having means to engage said element and thereby hold the element-equipped flap firmly down on said arm and folded article, and clamping means for grasping and drawing the opposite flap in place and facilitate securing its fastening means onto said element to secure said flaps together and hold the article in position in the wrapper, so as to facilitate closing a third flap by hand with its securing means engaged on said element and to facilitate removing the wrapper from the support with the article held safely in its folded condition therein.

6. A machine for inclosing a folded parachute in a flap-equipped pack of the type wherein at least one of the flaps is provided with cones and the others with eyelets for engaging said cones, said machine comprising a support having a dished part to receive the pack therein with its flaps unfolded and the folded parachute resting on the pack, an arm mounted at one end on the support and free at the other end to bear down on the parachute and hold it in place, a retaining member movably mounted on the machine and having means at its free end to grasp said cones, means to force down said member and thereby hold down said cone-equipped flap and parachute, clamping means for grasping and drawing the opposite flap, and means for actuating said clamping means by a foot to force the flaps together and leave the hands free to facilitate securing the eyelets on the cones, whereby to hold the pack and facilitate closing a third flap with its eyelets engaging said cones, so that the pack with inclosed parachute may be readily withdrawn from the machine.

7. A machine for inclosing a folded parachute in a flap-equipped pack of the type wherein at least one of the flaps is provided with cones and the others with eyelets for engaging said cones, said machine comprising a supporting platform having a recess to receive the main part of the pack therein with its flaps unfolded and the parachute resting properly folded on said main part, an arm movably supported at one end and free at the other end to bear down on the parachute, a retaining member swingable on the machine being notched at its free end to engage said cones, a foot treadle to operate said member and hold said cone-equipped flap firmly down on said arm and thereby compact the parachute, clamping means for grasping and drawing the opposite flap, and a treadle for actuating said clamping means by a foot to force the flaps together and leave the hands free to expedite securing the eyelets onto the cones, whereby then to hold the pack by foot power and facilitate closing a third flap by hand with its eyelet engaging one of said cones, so that the pack with the parachute securely held in its folded position therein may be slid from said arm and withdrawn from the machine.

8. In the method of inclosing a folded parachute in a pack which contains flaps equipped with cooperating securing elements, the procedure which involves the following steps: supporting the pack on a support with the pack flaps extending outwardly and the folded parachute resting on the pack, pressing down and holding the parachute firmly compacted on said support, engaging the elements provided on one flap and utilizing foot power for drawing and retaining said flap in place, then drawing an opposing flap forcefully around the parachute and holding it down on said held flap by foot power, in the meantime utilizing the hands for securing the elements of said flaps together, and drawing a third flap into closing position and securing its element onto those fastened elements, so as to facilitate withdrawing the pack with securely-inclosed folded parachute from the support.

9. The method of inclosing a folded parachute in a pack which contains flaps equipped with cooperating securing elements, said method comprising the following steps: placing the pack on suitable supporting means with its flaps extending outwardly and the folded parachute resting on the pack, pressing down and holding the parachute firmly compacted, engaging the elements provided on one flap and utilizing foot power for retaining said flap in place and forcing said one flap down firmly on the folded parachute, drawing an opposing flap firmly around the parachute and holding it down upon said held flap by foot power thus leaving the hands free for securing the elements of these flaps together, drawing a third flap in closing position and engaging its element onto one of these securing elements, applying a ripcord to secure the elements together on the closed flaps, withdrawing the said pack with securely inclosed folded parachute from said supporting means, and finally closing a fourth flap by hand.

10. A parachute pack closing device comprising means to support a parachute pack which carries a folded parachute thereon and which includes foldable flaps extending outwardly therefrom, means on said device to engage one flap of the pack whereby to hold that flap firmly in its closed position, and means for engaging a flap opposite the first said flap and drawing it down in closed position thereon, the device being arranged and constructed for holding the pack so that a third flap on the pack can then be conveniently drawn manually in closed position, whereby the pack with the folded parachute retained therein may thereupon be readily withdrawn from the device.

EDWARD L. SELSMEYER.

REFERENCES CITED

The following references are of record in the file of this patent:

UNITED STATES PATENTS

| Number | Name | Date |
|---|---|---|
| 1,623,300 | Brady | Apr. 5, 1927 |
| 2,335,589 | Fremeau | Nov. 30, 1943 |
| 2,357,805 | Bloxon | Sept. 12, 1944 |
| 2,357,828 | Hurt | Sept. 12, 1944 |

OTHER REFERENCES

"Service Manual For Irvin Air Chutes," published by Irving Air Chute Co., Inc., 1670 Jefferson Ave., Buffalo, N. Y., pages 24 to 30, inclusive. (A copy of this manual is in Division 22, U. S. Patent Office, in Class 244, Subclass 142.)